UNITED STATES PATENT OFFICE.

LOUIS GOTTSCHALK, OF CHICAGO, ILLINOIS, ASSIGNOR OF TWO-THIRDS TO HARRY J. GOTTHELF AND FRANK R. BAKER, OF SAME PLACE.

PROCESS OF MAKING SOAP.

SPECIFICATION forming part of Letters Patent No. 573,084, dated December 15, 1896.

Application filed March 2, 1896. Serial No. 581,566. (No specimens.)

*To all whom it may concern:*

Be it known that I, LOUIS GOTTSCHALK, a citizen of the United States, residing at Chicago, Illinois, have invented a certain new and useful Process for Making a Soap Ingredient or Filler and for Making Soap, of which the following is a specification.

The object of my process for making a soap ingredient or filler and for making soap is to utilize what is ordinarily known as "tank-water"—that is, water which is left as the residuum in tanks in which tallow, lard, and other oleaginous substances are rendered and which contain to a certain extent an amount of solid matter that I desire to utilize. The tank-water is boiled down to about one-half ($\frac{1}{2}$) its bulk, so that it is of the consistency of thick syrup, when it is ready for my process. The tank-water at this stage is of a dark color and of an offensive smell. The first thing therefore that I desire to do is to clarify and to free it from its objectionable odor. In order to do this, I make use of some oxidizing substance—that is, some substance, ingredient, or composition capable of freeing oxygen by chemical action—as, for instance, permanganate of potash and sulfuric acid. The substances are about in the proportion of one ounce of each to one hundred pounds of tank-water, although of course the proportions may be varied somewhat as circumstances may render advisable. In mentioning permanganate of potash and sulfuric acid I desire it to be understood that I do not limit myself merely to these substances, as it is obvious that a great many different kinds of oxidizing ingredients could be employed in their place and I only mention them as substances which can be used successfully, if preferred. After these ingredients or equivalents have been added to the tank-water the whole is subjected to heat, and preferably to a heat at the boiling-point, while being stirred or agitated, so as to effect a thorough intermixture of the ingredients.

After the materials have been treated as above explained they are allowed to stand a short time, so that the mixture will become fixed, when I add to the tank-water an equal bulk of caustic-soda solution at 25° Baumé or equivalent substances. The resulting mixture is again subjected to heat, and preferably to heat at the boiling-point, while being stirred or agitated. After the material has been thus subjected to heat for a short time it will be found that it contains soap, glue, glycerin, and ammonia. It is then ready to be mixed with a soap prepared in the ordinary way. This forms what I term my "soap ingredient" or "filler." It is substantially colorless and odorless and may be immediately mixed with soap made in the ordinary way or kept any desired length of time and then so mixed. In making the mixture with the soap as ordinarily prepared the proportions may vary widely. In fact I have added from one to more than one hundred per cent. (100%) of the mixture to the soap as ordinarily prepared. The resulting product is a soap of superior cleansing qualities capable of breaking hard water and suitable both for the toilet and the laundry.

What I regard as new, and desire to secure by Letters Patent, is—

1. The process of utilizing tank-water, which consists in mixing with it an ingredient capable of freeing oxygen in the mixture, then subjecting the mixture to heat, then adding thereto a caustic-soda solution, then subjecting the mixture to heat, substantially as described.

2. The process of utilizing tank-water, which consists in mixing with it an ingredient capable of freeing oxygen in the mixture, then subjecting the mixture to heat, then adding thereto a caustic-soda solution, then subjecting the mixture to heat, and then mixing it with soap as ordinarily prepared, substantially as described.

LOUIS GOTTSCHALK.

Witnesses:
THOMAS A. BANNING,
THOMAS B. MCGREGOR.